(12) United States Patent
Zou et al.

(10) Patent No.: US 11,316,910 B2
(45) Date of Patent: Apr. 26, 2022

(54) METHOD FOR UPLOADING AND DOWNLOADING STREAMING MEDIA RESOURCES, DISTRIBUTION SYSTEM AND STREAMING MEDIA SERVER

(71) Applicant: WANGSU SCIENCE & TECHNOLOGY CO., LTD., Shanghai (CN)

(72) Inventors: Shuang Zou, Shanghai (CN); Shibiao Lv, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 742 days.

(21) Appl. No.: 16/098,574

(22) PCT Filed: May 9, 2018

(86) PCT No.: PCT/CN2018/086181
§ 371 (c)(1),
(2) Date: Nov. 2, 2018

(87) PCT Pub. No.: WO2019/200631
PCT Pub. Date: Oct. 24, 2019

(65) Prior Publication Data
US 2021/0243238 A1 Aug. 5, 2021

(30) Foreign Application Priority Data
Apr. 18, 2018 (CN) .......................... 201810349757.X

(51) Int. Cl.
*H04L 29/06* (2006.01)
*H04L 29/08* (2006.01)
(Continued)

(52) U.S. Cl.
CPC .......... *H04L 65/4069* (2013.01); *H04L 67/02* (2013.01)

(58) Field of Classification Search
None
See application file for complete search history.

(56) References Cited

U.S. PATENT DOCUMENTS 7,733,808 B2 * 6/2010 Hu ..................... H04N 21/4788
370/256
10,200,465 B2 * 2/2019 Huang .................... H04L 29/08
(Continued)

FOREIGN PATENT DOCUMENTS

| CN | 101729602 A | 6/2010 |
| CN | 102006368 A | 4/2011 |

(Continued)

OTHER PUBLICATIONS

The European Patent Office (EPO) The Extended European Search Report for 18821981.0 dated Jun. 29, 2020 10 Pages.
(Continued)

*Primary Examiner* — Davoud A Zand

(57) ABSTRACT

A method for uploading streaming media resources includes: receiving an uploading request for a target streaming media resource sent by a stream-pushing client, where the uploading request includes candidate streaming media information; generating response streaming media information based on the candidate streaming media information, and generating an access address for accessing the target streaming media resource; feeding back the response streaming media information and the access address to the stream-pushing client; and receiving the processed target streaming media resource uploaded by the stream-pushing client, and associating and storing the processed target streaming media resource with the response streaming media information.

16 Claims, 7 Drawing Sheets

(51) Int. Cl.
H04L 65/61 (2022.01)
H04L 67/02 (2022.01)

(56) References Cited

U.S. PATENT DOCUMENTS

| | | | |
|---|---|---|---|
| 10,477,286 B2* | 11/2019 | Chen | H04L 65/4084 |
| 10,523,755 B1* | 12/2019 | Quach | H04L 65/80 |
| 10,638,192 B2* | 4/2020 | Lu | H04N 21/4305 |
| 2003/0172116 A1 | 9/2003 | Curry et al. | |
| 2010/0146055 A1 | 6/2010 | Hannuksela | |
| 2012/0069131 A1* | 3/2012 | Abelow | G06Q 10/067 |
| | | | 348/14.01 |
| 2014/0195675 A1* | 7/2014 | Silver | H04L 65/607 |
| | | | 709/224 |
| 2015/0156281 A1 | 6/2015 | Krieger et al. | |
| 2016/0294903 A1* | 10/2016 | Hu | H04L 65/1083 |
| 2017/0250768 A1* | 8/2017 | Tawfiq Moshtaha | G06Q 30/02 |

FOREIGN PATENT DOCUMENTS

| | | |
|---|---|---|
| CN | 105830047 A | 8/2016 |
| CN | 105847264 A | 8/2016 |
| CN | 107809683 A | 3/2018 |
| EP | 3079328 A1 | 10/2016 |

OTHER PUBLICATIONS

The China National Intelleectual Property Administration (CNIPA) The China Search Report for 201810349757.X dated Apr. 14, 2020 5 Pages.

* cited by examiner

METHOD FOR UPLOADING AND DOWNLOADING STREAMING MEDIA RESOURCES, DISTRIBUTION SYSTEM AND STREAMING MEDIA SERVER

CROSS-REFERENCES TO RELATED APPLICATIONS

This application is a national phase entry under 35 U.S.C § 371 of International Application No. PCT/CN2018/086181 filed on May 9, 2018, which claims priority of Chinese Patent Application No. 201810349757X, filed with the State Intellectual Property Office of P. R. China on Apr. 18, 2018, the entire contents of all of which are incorporated herein by reference.

FIELD OF DISCLOSURE

The present disclosure generally relates to the field of Internet technology and, more particularly, relates to a method for uploading and downloading streaming media resources, a distribution system, and a streaming media server.

BACKGROUND

WebRTC (Web Real-Time Communication) protocol is widely used in network-based video conferencing, video calling, and other applications due to its cross-platform structure and high real-time performance.

Referring to FIG. 1, in the standard WebRTC protocol, a peer-to-peer communication link may be generally established between User A and User B. The specific process may include the following steps:

Step 1: User A sends a query to the P2P server to obtain its own public network address.

Step 2: User A generates an Offer SDP according to the streaming media information collected by the hardware of User A, and sends the Offer SDP to User B through the relay of the signaling server.

Step 3: User B receives and processes the Offer SDP, generates an Answer SDP according to the streaming media information collected by the hardware of User B, and sends the Answer SDP to User A through the relay of the signaling server.

Step 4: User B sends a query to the P2P server to obtain its own public network address.

Step 5: User A generates an ICE Candidate according to its public network address, and transmits the generated ICE Candidate to User B through the relay of the signaling server.

Step 6: User B generates an ICE Candidate according to its public network address, and transmits the generated ICE Candidate to User A through the relay of the signaling server.

Step 7: Both User A and User B may send their own streaming media to the other party according to the exchanged SDP and ICE Candidate, and receive the streaming media sent by the other party.

For a multi-person video conference scenario, conference participants need to perform the above standard process with all other users in the conference, so that communication connections can be established with other users. After establishing the communication connections with other users, when one of the conference participants needs to share a streaming media resource, the streaming media resource needs to be sent to each other user separately. For example, there are currently a total of N users participating in the video conference. Accordingly, a conference participant needs to perform N−1 times of the above seven steps to establish communication connections with the other users. Afterwards, when that user needs to share a streaming media resource, the streaming media resource needs to be sent N−1 times. It can be seen that according to the current WebRTC standard process, it takes users a really long time to establish connections with each other. This will affect the timeliness of communication. In addition, every time a streaming media resource needs to be shared, the amount of data repeatedly transmitted between users is too high, resulting in high demand on network bandwidth.

BRIEF SUMMARY OF THE DISCLOSURE

The present disclosure provides a method for uploading and downloading streaming media resources, a distribution system, and a streaming media server, which may reduce the demand on network bandwidth, and at the same time improve the timeliness of communication.

To achieve the above objective, in one aspect, the present disclosure provides a method for uploading stream media resources. The method includes: receiving an uploading request for a target streaming media resource sent by a stream-pushing client, where the uploading request includes candidate streaming media information supported by the stream-pushing client; generating response streaming media information based on the candidate streaming media information, and generating an access address for accessing the target streaming media resource; feeding back the response streaming media information and the access address to the stream-pushing client, to allow the stream-pushing client to process the target streaming media resource according to the response streaming media information, and according to the access address, upload the processed target streaming media resource; and receiving the processed target streaming media resource uploaded by the stream-pushing client, and associating and storing the processed target streaming media resource with the response streaming media information.

To achieve the above objective, in another aspect, the present disclosure further provides a streaming media server. The streaming media server includes a memory and a processor, where the memory stores computer programs that, when executed by the processor, implement the above-described method.

To achieve the above objective, in another aspect, the present disclosure further provides a method for downloading stream media resources. The method includes: receiving an acquisition request for a target streaming media resource from a stream-pulling client; determining whether the target streaming media resource exists locally, and if the target streaming media resource exists locally, generating an access address for accessing the target streaming media resource; and feeding back the access address and target streaming media information associated with the target streaming media resource to the stream-pulling client, to allow the stream-pulling client to obtain the target streaming media resource based on the access address and the target streaming media information.

To achieve the above objective, in another aspect, the present disclosure further provides a streaming media server. The streaming media server includes a memory and a processor, where the memory stores computer programs that, when executed by the processor, implement the above-described method.

To achieve the above objective, in another aspect, the present disclosure further provides a distribution system. The system includes a stream-pushing client and a streaming media server, where: the stream-pushing client is configured to determine candidate streaming media information supported by the stream-pushing client, send an uploading request for a target streaming media resource to the streaming media server, where the uploading request includes the candidate streaming media information, receive a response message returned by the streaming media server, where the response message includes response streaming media information and an access address generated by the streaming media server, process the target streaming media resource according to the response streaming media information, and according to the access address, upload the processed target streaming media resource; and the streaming media server is configured to generate the response streaming media information based on the candidate streaming media information, generate the access address for accessing the target streaming media resource, feed back the response message including the response streaming media information and the access address to the stream-pushing client, receive the processed target streaming media resource uploaded by the stream-pushing client, and associate and store the processed target streaming media resource with the response streaming media information.

As can be seen from the above, in the technical solutions provided by the present disclosure, the entire process may be split into two parts: uploading and downloading. The HTTP protocol and the WebRTC protocol are integrated into these two parts, thereby simplifying the process of establishing a communication connection. In addition, through the relay of the streaming media resources by the streaming media server, users do not need to repeatedly send the same streaming media resource in the network multiple times, and only need to upload/download the streaming media resources to/from the streaming media server, which may greatly reduce the demand on network bandwidth. Specifically, in the uploading part, a stream-pushing client may send an HTTP uploading request to the streaming media server. An HTTP module in the streaming media server may generate response streaming media information and an access address by analyzing the HTTP uploading request, and provide the response streaming media information and the access address to the stream-pushing client through an HTTP response message. Accordingly, the stream-pushing client may establish a WebRTC communication connection with the streaming media server, and upload the streaming media resource afterwards according to the access address. The uploaded streaming media resource may be processed by a WebRTC module in the streaming media server. In the downloading part, a stream-pulling client may send an HTTP acquisition request to the streaming media server. The HTTP module in the streaming media server may generate an access address. The access address and streaming media information are included in an HTTP response message and fed back to the stream-pulling client, where the streaming media information is associated with the streaming media resource and the HTTP acquisition request is directed to the streaming media resource. In this way, the stream-pulling client may establish a WebRTC communication connection with the streaming media server. Afterwards, the stream-pulling client downloads the streaming media resource from the WebRTC module in the streaming media server according to the access address provided by the streaming media server. It can be seen that the technical solutions provided by the present disclosure simplify the process of establishing the WebRTC communication connections, thereby improving the timeliness of communication. In addition, through the relay of the streaming media resources by the streaming media server, the demand on network bandwidth may be greatly reduced.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objective, technical solutions, and advantages of the present disclosure clearer, the present disclosure will be made in detail hereinafter with reference to the accompanying drawings.

Embodiment 1

Figure 1:
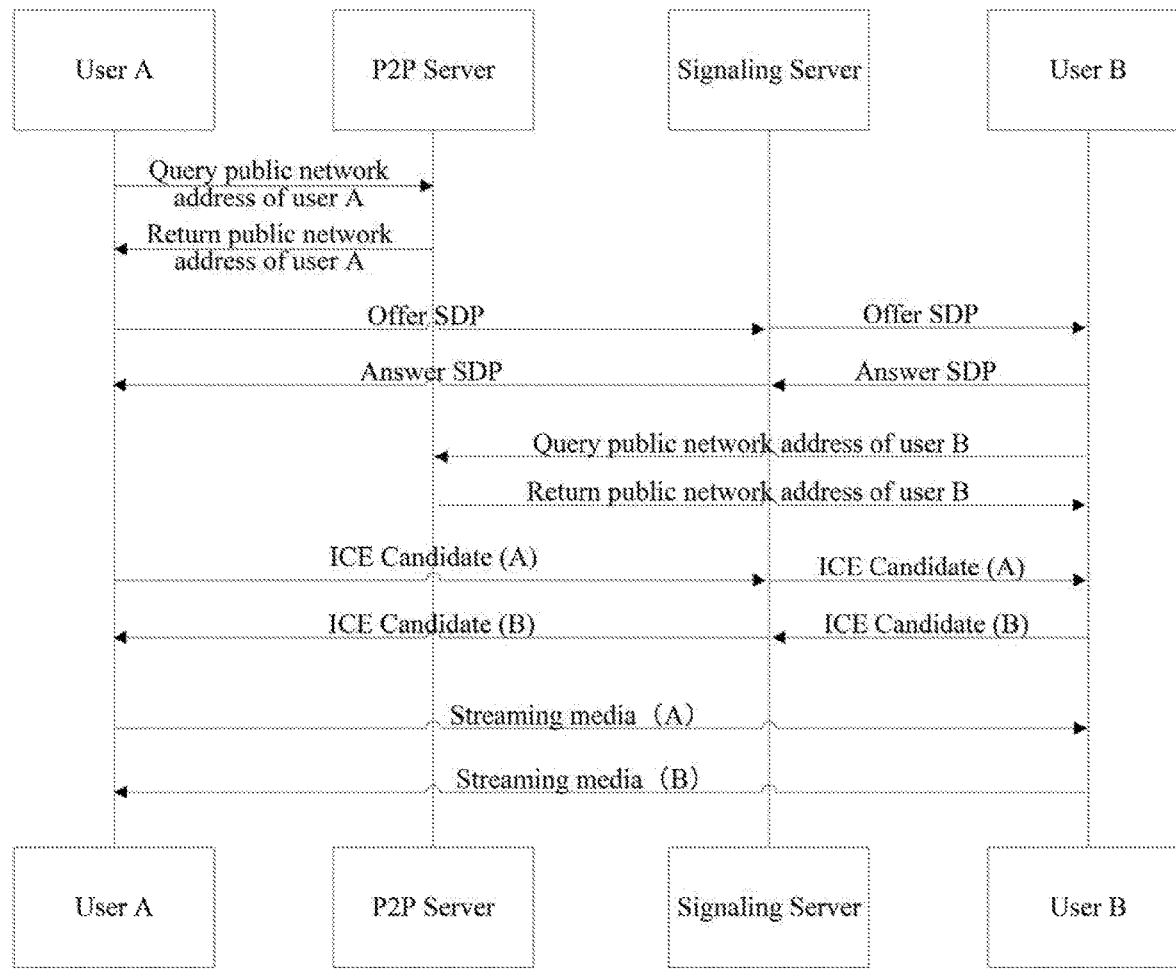
FIG. 1 is an interactive diagram of a standard WebRTC process in the prior art.
Figure 2:
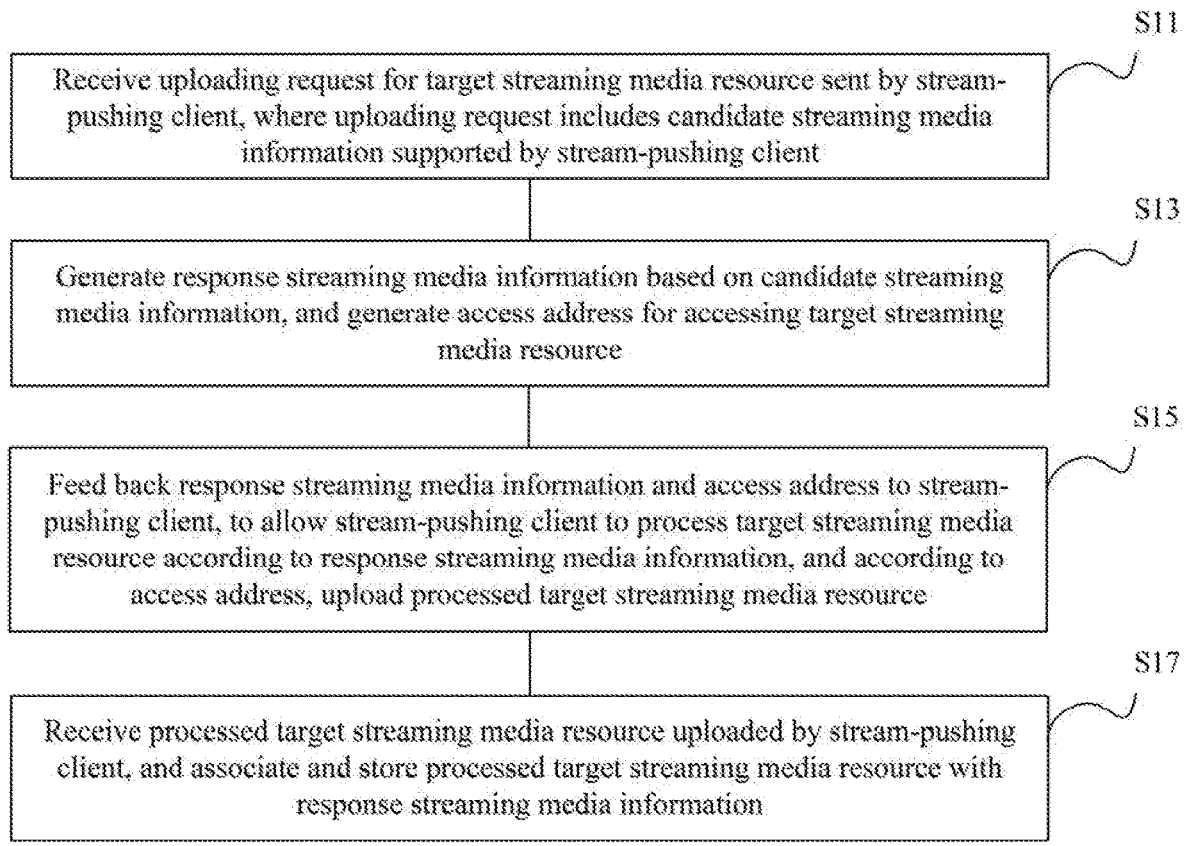
FIG. 2 is a flowchart of a method for uploading streaming media resources according to some embodiments of the present disclosure.
Figure 3:
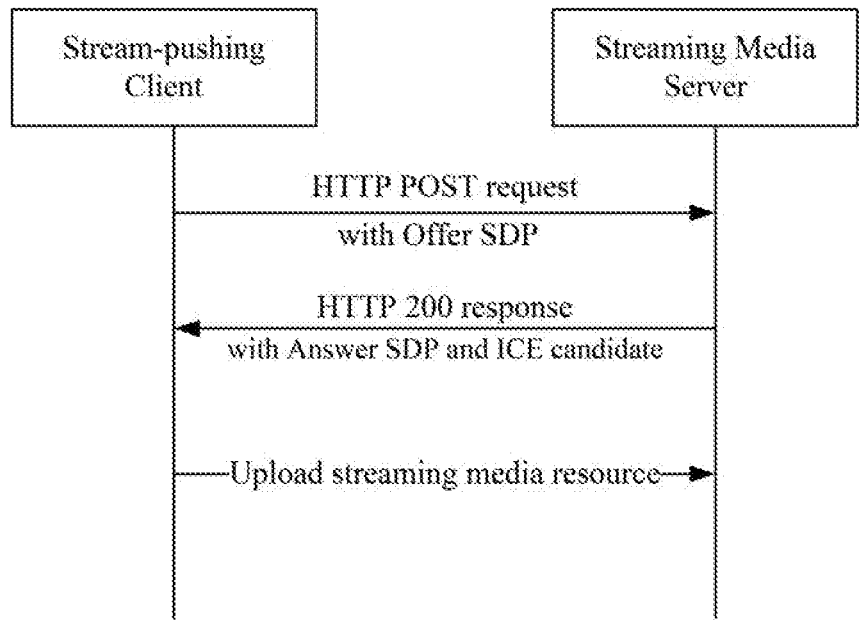
FIG. 3 is an interactive diagram of a method for uploading streaming media resources according to some embodiments of the present disclosure.

The disclosed embodiment provides a method for uploading streaming media resources. The method may be applied between a stream-pushing client and a streaming media server. Referring to FIG. 2 and FIG. 3, the method may include the following steps.

S11: receive an uploading request for a target streaming media resource sent by a stream-pushing client, where the uploading request includes candidate streaming media information supported by the stream-pushing client.

Figure 6:
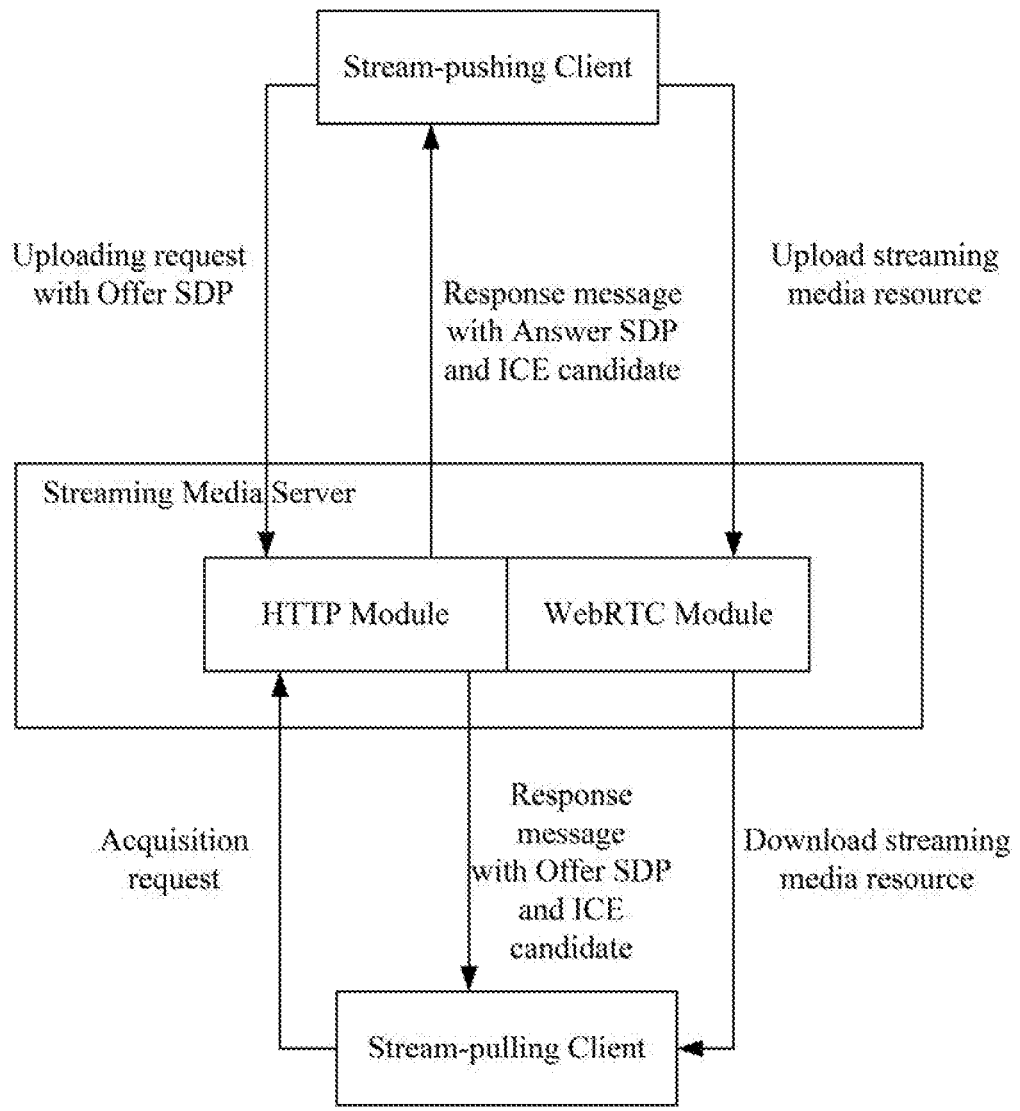
FIG. 6 is a schematic diagram of a distribution system for streaming media resources according to some embodiments of the present disclosure.

In the disclosed embodiment, data may be stored and transferred through the streaming media server. Compared with the standard WebRTC process, the P2P server and the signaling server may be omitted, thereby simplifying the system architecture. Referring to FIG. 6, the streaming media server may include an HTTP module for processing HTTP requests and a WebRTC module for performing streaming media resource transmission.

In the disclosed embodiment, each of the streaming media resources may be assigned a global unique identifier, so that the corresponding streaming media resource may be signified by the unique identifier. In real applications, a unique identifier may be a Uniform Resource Locator (URL). In the disclosed embodiment, the naming rule of a URL may be consistent with the naming rules of URLs of the streaming media resources in RTMP (Real Time Messaging Protocol) and HTTP (HyperText Transfer Protocol). For example, the URL of a streaming media resource may be http://www.a.com/live/test.

In the disclosed embodiment, when the stream-pushing client needs to upload a target streaming media resource to the streaming media server, an Offer SDP may be generated based on the streaming media information collected by the hardware of the client. In the Offer SDP, information supported by the client, such as the video encoding modes, the audio encoding modes, the transmission protocol, and the security protocol, may be included. For instance, a simple example of an Offer SDP may be as follows:

```
Offer SDP {
   Going to send a streaming media resource now;
   Video coding may use H264, VP8, VP9;
   Audio coding may use AAC, MP3, OPUS;
   Encryption may be enabled;
}
```

As can be seen from the above, in the Offer SDP, a plurality of video encoding modes and a plurality of audio encoding modes supported by the client may be listed. Accordingly, the generated Offer SDP may include the above candidate streaming media information.

In the disclosed embodiment, the stream-pushing client may send the uploading request for the target streaming media resource to the streaming media server. The uploading request may be, for example, an HTTP POST request. The request message body of the request may be the above-described Offer SDP. Accordingly, the uploading request may include the candidate streaming media information supported by the stream-pushing client. In addition, the requested URL of the uploading request may be the URL of the target streaming media resource. Accordingly, the uploading request may include the unique identifier that signifies the target streaming media resource.

S13: generate response streaming media information based on the candidate streaming media information, and generate an access address for accessing the target streaming media resource.

In the disclosed embodiment, after receiving the uploading request, the streaming media server may extract the included candidate streaming media information. Afterwards, according to its own hardware configuration, the streaming media server may determine a target video coding mode and a target audio coding mode supported by the server from the candidate streaming media information, and construct response streaming media information based on the target video coding mode and the target audio coding mode. For example, the streaming media server may determine that it is able to accept the target streaming media resource to be uploaded by the stream-pushing client at this moment, and specify that the video encoding mode is H264, the audio encoding mode is OPUS, and the target streaming media resource may be encrypted. Accordingly, an example of the response streaming media information (Answer SDP) generated by the streaming media server may be as follows:

```
Answer SDP {
   Can receive the streaming media resource you send;
```
-continued
```
   Please use H264 for video encoding;
   Please use OPUS for audio coding;
   Please enable encryption;
}
```

In this way, the streaming media server may generate the response streaming media information for the target streaming media resource. The audio/video encoding mode may be specified in the response streaming media information.

In the disclosed embodiment, in order to establish a WebRTC, apart from the SDP information, ICE candidate information is also required. The ICE candidate information may be constructed based on a public network IP address. In general, as long as one end of a WebRTC communication connection has a fixed public IP address, the two sides may be connected to each other. The streaming media server generally has a fixed public IP address. Therefore, a client that tries to establish a WebRTC communication connection with the streaming media server may omit the process of obtaining its own public network address from the P2P server, and the process of generating the ICE candidate may be executed on the streaming media server side. Specifically, the streaming media server may obtain its own public network IP address and port address, where the public network IP address may be stored in the streaming media server without requiring to read from other servers. Afterwards, the streaming media server may use the combination of the public network IP address and the port address as an access address for accessing the target streaming media resource. For example, the public network IP address may be 10.8.114.195, and the port address for receiving the streaming media resource may be 54225, and the eventually generated access address may be 10.8.114.195:54225. This access address may be used as the above ICE candidate.

In this way, the streaming media server may obtain the response streaming media information (Answer SDP) and the ICE candidate required to establish the WebRTC communication connection.

S15: feed back the response streaming media information and the access address to the stream-pushing client, to allow the stream-pushing client to process the target streaming media resource according to the response streaming media information, and according to the access address, upload the processed target streaming media resource.

In the disclosed embodiment, the streaming media server may feed back a response message to the stream-pushing client in response to the received uploading request. The response message may be an HTTP response message with a status code of 200. The response streaming media information and the access address may be included in the response message body of the response message. The foregoing processes of receiving the uploading request, generating the response stream media information and the access address, and returning the response message may all be completed in the HTTP module of the streaming media server.

After receiving the Answer SDP and the ICE candidate, the stream-pushing client may establish a WebRTC communication connection with the streaming media server. Afterwards, the stream-pushing client may process (e.g., encode, encrypt, etc.) the target streaming media resource according to the information specified in the Answer SDP. After the processing is completed, the processed target streaming media resource may be uploaded to the streaming media server based on the access address.

S17: receive the processed target streaming media resource uploaded by the stream-pushing client, and associate and store the processed target streaming media resource with the response streaming media information.

In the disclosed embodiment, after receiving the processed target streaming media resource uploaded by the stream-pushing client, the streaming media server may store the processed target streaming media resource in a specified path. Afterwards, an association between the unique identifier of the target streaming media resource and the response streaming media information may be established. Later, if a stream-pulling client requests to acquire the target streaming media resource, the associated response streaming media information may be obtained according to the unique identifier of the target streaming media resource, and the response streaming media information may be fed back to the stream-pulling client as one of the requirements in establishing the WebRTC communication connection.

In the disclosed embodiment, the foregoing process of transmitting the target streaming media resource from/to the stream-pushing client may be completed in the WebRTC module of the streaming media server.

Embodiment 2

Figure 4:
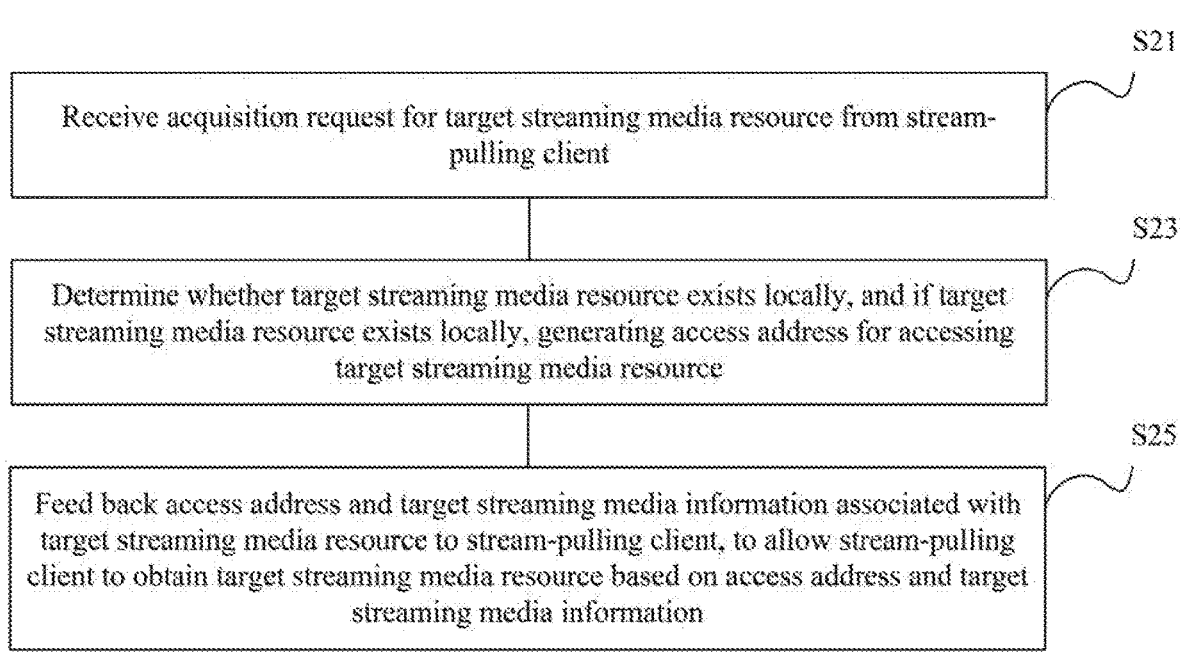
FIG. 4 is a flowchart of a method for downloading streaming media resources according to some embodiments of the present disclosure.
Figure 5:
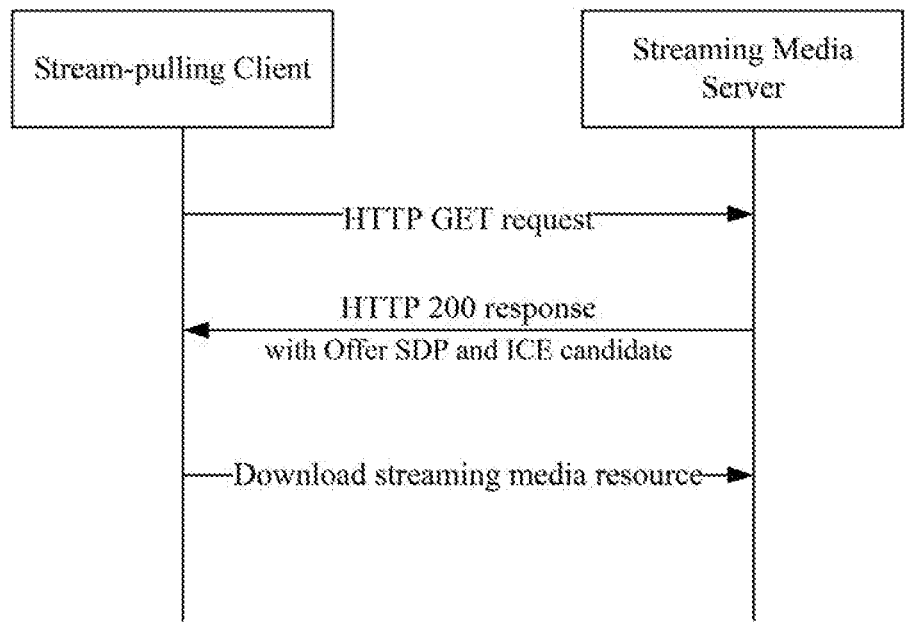
FIG. 5 is an interactive diagram of a method for downloading streaming media resources according to some embodiments of the present disclosure.

The present disclosure further provides a method for downloading a streaming media resource. The method may be applied between a streaming media server and a stream-pulling client. Referring to FIG. 4 and FIG. 5, the method may include the following steps.

S21: receive an acquisition request for a target streaming media resource from a stream-pulling client.

In the disclosed embodiment, when a stream-pulling client needs to play a streaming media resource shared locally by other users, the streaming media resource may be obtained from the streaming media server. Specifically, the stream-pulling client may send an acquisition request for the target streaming media resource to the streaming media server. The acquisition request may be, for example, an HTTP GET request. The URL of the request may be the unique identifier of the target streaming media resource. Accordingly, the acquisition request may include the unique identifier for signifying the target streaming media resource.

S23: determine whether the target streaming media resource exists locally, and if the target streaming media resource exists locally, generate an access address for accessing the target streaming media resource.

In the disclosed embodiment, after receiving the acquisition request, the streaming media server may determine, according to the unique identifier included in the request, whether the target streaming media resource that the stream-pulling client wants to download exists locally. Specifically, the streaming media server may locally query whether there is a streaming media resource having that unique identifier. If there is a streaming media resource having that unique identifier, it may be determined that the target streaming media resource exists locally. If there is no streaming media resource having that unique identifier, it may be determined that the target streaming media resource does not exist locally.

In the disclosed embodiment, if the target streaming media resource does not exist in the streaming media server, the streaming media server may feed back an error notification message to the stream-pulling client. If the target streaming media resource exists in the streaming media server, the stream-pulling client may establish a WebRTC communication connection with the streaming media server, to allow the target streaming media resource to be downloaded from the streaming media server.

In the disclosed embodiment, the streaming media server has a fixed public network IP address, and thus the server may obtain its own public network IP address and port address. The public network IP address may be stored in the streaming media server without requiring to read from other servers. Afterwards, the streaming media server may use the combination of the public network IP address and the port address as the access address for accessing the target streaming media resource. For example, the public network IP address may be 10.8.114.195, and the port address for transmitting the streaming media resource may be 54225. Accordingly, the eventually generated access address may be 10.8.114.195:54225. This access address may be used as the ICE candidate required to establish the WebRTC communication connection.

S25: feed back the access address and target streaming media information associated with the target streaming media resource to the stream-pulling client, to allow the stream-pulling client to obtain the target streaming media resource based on the access address and the target streaming media information.

In the disclosed embodiment, the streaming media resource stored in the streaming media server may be uploaded by another stream-pushing client. According to the description in Embodiment 1, after a stream-pushing client uploads the streaming media resource, the streaming media server may associate and store the streaming media resource and the corresponding response streaming media information. In this way, the streaming media server may query the response streaming media information associated with the target streaming media resource according to the unique identifier of the target streaming media resource, and use the response streaming media information as the target streaming media information associated with the target streaming media resource. Afterwards, the streaming media server may provide the target streaming media information to the stream-pulling client as the Offer SDP. The streaming media server may also provide the access address generated in Step S23 as the ICE candidate to the stream-pulling client. Specifically, the streaming media server may return a response message to the stream-pulling client, where the response message may be, for example, an HTTP response message with a status code of 200. The response message body of the response message may include the above access address (ICE candidate) and the target streaming media information (Offer SDP) associated with the target streaming media resource. After the stream-pulling client obtains the Offer SDP and the ICE candidate provided by the streaming media server, the stream-pulling client may establish a WebRTC communication connection with the streaming media server.

In the disclosed embodiment, after the stream-pulling client establishes the WebRTC communication connection with the streaming media server, the target streaming media resource may be obtained from the streaming media server based on the access address and the target streaming media information. The target streaming media resource may be decoded and decrypted according to the audio/video encoding modes and the encryption method specified in the target streaming media information, so that the decoded and decrypted target streaming media resource may be locally played.

In the disclosed embodiment, the foregoing processes of receiving the acquisition request and returning the response message to the stream-pulling client may be performed in the HTTP module of the streaming media server, and the process of transmitting the target streaming media resource to/from the stream-pulling client may be completed in the WebRTC module of the streaming media server.

Embodiment 3

The present disclosure further provides a streaming media server, which includes a memory and a processor. The memory stores computer programs that, when executed by the processor, may implement various methods and steps described in Embodiment 1.

In addition, the present disclosure further provides a streaming media server, which includes a memory and a processor. The memory stores computer programs that, when executed by the processor, may implement various methods and steps described in Embodiment 2.

In the disclosed embodiment, the memory may include physical devices, for storing information, that in general digitize the information and then store it in a medium using an electrical, magnetic, or optical means. The memory in the disclosed embodiment may also include: a device for storing information using electric energy, such as a RAM, a ROM, or the like; a device for storing information using magnetic energy, such as a hard disk, a floppy disk, a magnetic tape, a magnetic core memory, a magnetic bubble memory, and a USB flash drive; and a device for storing information in an optical approach, such as a CD or a DVD. It should be noted that computer storage media in other forms, such as a quantum memory, a graphene memory, are also contemplated.

In the disclosed embodiment, the processor may be embodied in various suitable manners. For instance, the processor may take the form of, for example, a microprocessor or processor and computer readable media for storing computer readable program code (e.g., software or firmware) executable by such microprocessor or processor, a logic gate, a switch, an Application Specific Integrated Circuit (ASIC), a programmable logic controller, or an embedded microcontroller, etc.

For the streaming media server provided by the present embodiment in the present specification, its specific functions and achieved technical effects may refer to the foregoing method-related embodiments described in the present specification, which will not be repeated again here.

Embodiment 4

Referring to FIG. 6, the present disclosure further provides a distribution system for streaming media resources. The system includes a stream-pushing client and a streaming media server, where:

the stream-pushing client is configured to determine candidate streaming media information supported by the stream-pushing client, send an uploading request for a target streaming media resource to the streaming media server, where the uploading request includes the candidate streaming media information, receive a response message returned by the streaming media server, where the response message includes response streaming media information and an access address generated by the streaming media server, process the target streaming media resource according to the response streaming media information, and according to the access address, upload the processed target streaming media resource; and the streaming media server is configured to generate the response streaming media information based on the candidate streaming media information, generate the access address for accessing the target streaming media resource, feed back the response message including the response streaming media information and the access address to the stream-pushing client, receive the processed target streaming media resource uploaded by the stream-pushing client, and associate and store the processed target streaming media resource with the response streaming media information.

In one embodiment, the system further includes a stream-pulling client, where the stream-pulling client is configured to send an acquisition request for the target streaming media resource to the streaming media server, receive a response message returned by the streaming media server, where the response message includes the target streaming media information associated with the target streaming media resource, and further includes the access address generated by the streaming media server, and obtain the target streaming media resource from the streaming media server based on the access address and the target streaming media information; and correspondingly, the streaming media server is further configured to, in response to the acquisition request, generate the access address for accessing the target streaming media resource, and feed back the access address and the target streaming media information associated with the target streaming media resource to the stream-pulling client.

In one embodiment, the streaming media server, when generating the access address for accessing the target streaming media resource, obtains its own public IP address and port address, and uses the combination of the public network IP address and the port address as the access address for accessing the target streaming media resource.

Figure 7:
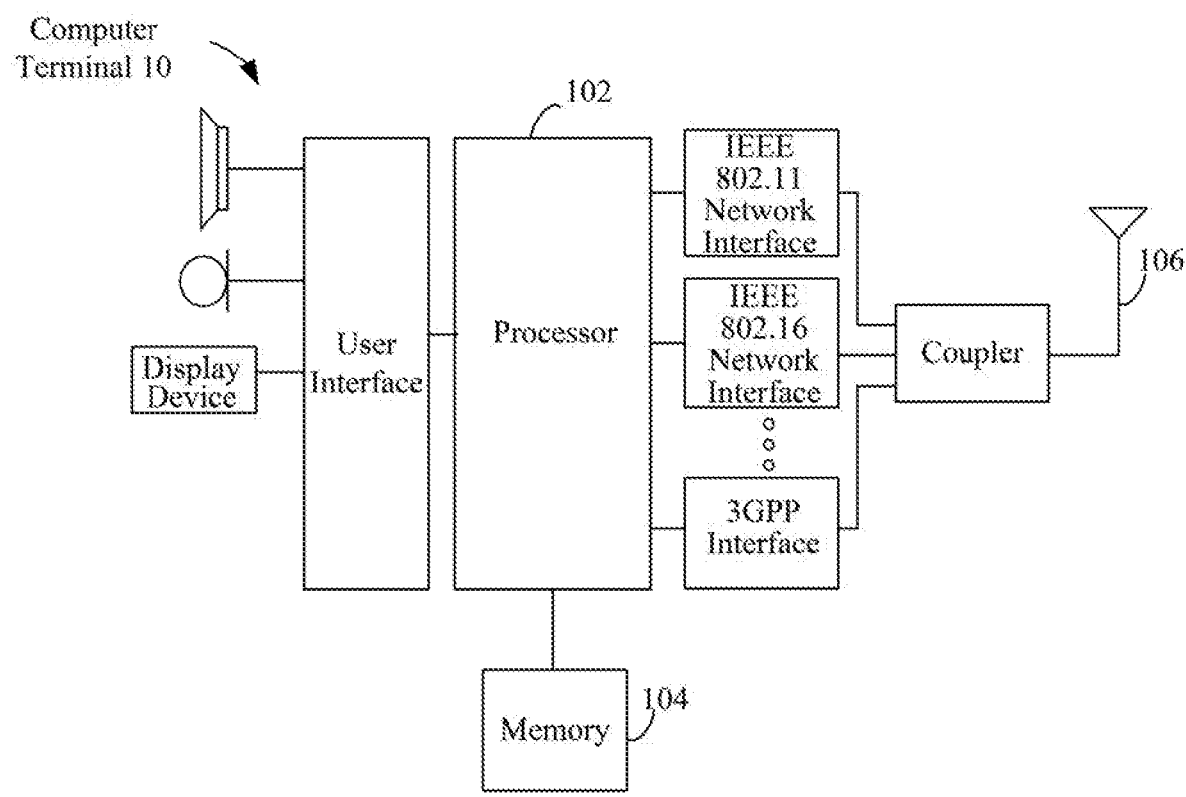
FIG. 7 is a schematic structural diagram of a computer terminal according to some embodiments of the present disclosure.

Referring to FIG. 7, in the present disclosure, the technical solutions in the foregoing embodiments may be applied to a computer terminal 10 shown in FIG. 7. The computer terminal 10 may include one or more (only one is shown in the figure) processors 102 (a processor 102 may include, but is not limited to, a processing device such as a microprocessor MCU or a programmable logic device FPGA), a memory 104 for storing data, and a transmission device 106 for communication purpose. Persons of ordinary skill in the art may understand that the structure shown in FIG. 7 is provided by way of illustration, but not by way of limitation of the structures of the above-described electronic devices. For example, the computer terminal 10 may also include more or fewer components than those shown in FIG. 7, or have a different configuration than that shown in FIG. 7.

The memory 104 may be used to store software programs and modules of application software. The processor 102 implements various functional applications and data processing by executing software programs and modules stored in the memory 104. The memory 104 may include a high-speed random access memory, and a non-volatile memory, such as one or more magnetic storage devices, flash memory, or other non-volatile solid-state memory. In some applications, the memory 104 may further include a memory remotely disposed with respect to the processor 102, which may be connected to the computer terminal 10 through a network. Examples of such network include, but are not limited to, the Internet, an intranet, a local area network, a mobile communication network, and combinations thereof.

The transmission device 106 is configured to receive or transmit data via the network. The aforementioned specific examples of the network may include a wireless network provided by the communication provider of the computer terminal 10. In one application, the transmission device 106 includes a network interface controller (NIC) that may be connected to other network devices through the base stations to allow it to communicate with the Internet. In one application, the transmission device 106 may be a Radio Frequency (RF) module that is configured to communicate with the Internet via a wireless approach.

As can be seen from the above, in the technical solutions provided by the present disclosure, the entire process may be split into two parts: uploading and downloading. The HTTP protocol and the WebRTC protocol are integrated into these two parts, thereby simplifying the process of establishing a communication connection. In addition, through the relay of the streaming media resources by the streaming media server, users do not need to repeatedly send the same streaming media resource in the network multiple times, and only need to upload/download the streaming media resources to/from the streaming media server, which may greatly reduce the demand on network bandwidth. Specifically, in the uploading part, a stream-pushing client may send an HTTP uploading request to the streaming media server. An HTTP module in the streaming media server may generate response streaming media information and an access address by analyzing the HTTP uploading request, and provide the response streaming media information and the access address to the stream-pushing client through an HTTP response message. Accordingly, the stream-pushing client may establish a WebRTC communication connection with the streaming media server, and upload the streaming media resource afterwards according to the access address. The uploaded streaming media resource may be processed by a WebRTC module in the streaming media server. In the downloading part, a stream-pulling client may send an HTTP acquisition request to the streaming media server. The HTTP module in the streaming media server may generate an access address. The access address and streaming media information are included in an HTTP response message and fed back to the stream-pulling client, where the streaming media information is associated with the streaming media resource and the HTTP acquisition request is directed to the streaming media resource. In this way, the stream-pulling client may establish a WebRTC communication connection with the streaming media server. Afterwards, the stream-pulling client downloads the streaming media resource from the WebRTC module in the streaming media server according to the access address provided by the streaming media server. It can be seen that the technical solutions provided by the present disclosure simplify the process of establishing the WebRTC communication connections, thereby improving the timeliness of communication. In addition, through the relay of the streaming media resources by the streaming media server, the demand on network bandwidth may be greatly reduced.

Through the foregoing description of the embodiments, it is clear to those skilled in the art that the various embodiments may take the form of a software plus a necessary general hardware platform implementation, and entirely a hardware implementation. In light of this understanding, the technical solutions, or essentially the parts that contribute to the current technology, may be embodied by way of a software product. The computer software product may be stored in a computer-readable storage medium, such as a ROM/RAM, a magnetic disc, an optical disc, etc., and include a variety of programs that cause a computing device (which may be a personal computer, a server, or a network device, etc.) to implement each embodiment or methods described in certain parts of each embodiment.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. A method for uploading streaming media resources by a streaming media server, comprising:
   receiving an uploading request for a target streaming media resource sent by a stream-pushing client, wherein the uploading request includes candidate streaming media information supported by the stream-pushing client;
   generating response streaming media information based on the candidate streaming media information, and generating an access address for accessing the target streaming media resource;
   feeding back the response streaming media information and the access address to the stream-pushing client, to allow the stream-pushing client to process the target streaming media resource according to the response streaming media information, and according to the access address, upload the processed target streaming media resource; and
   receiving the processed target streaming media resource uploaded by the stream-pushing client, and associating and storing the processed target streaming media resource with the response streaming media information.

2. The method according to claim 1, wherein generating the access address for accessing the target streaming media resource further includes:
   obtaining a public network IP address and a port address of the streaming server, and using a combination of the public network IP address and the port address as the access address for accessing the target streaming media resource.

3. The method according to claim 1, wherein feeding back the response streaming media information and the access address to the stream-pushing client further includes:
   returning a response message to the stream-pushing client, wherein a response message body of the response message includes the response stream media information and the access address.

4. The method according to claim 1, wherein the uploading request includes a unique identifier for signifying the target streaming media resource, and associating and storing the processed target streaming media resource with the response streaming media information further includes:
   storing the processed target streaming media resource in a specified path, and establishing an association between the unique identifier of the target streaming media resource and the response streaming media information.

5. The method according to claim 1, wherein the uploading request is an HTTP POST request, the candidate streaming media information is an Offer SDP, the response streaming media information is a first Answer SDP, and the access address is a first ICE candidate.

6. The method according to claim 5, wherein feeding back the response streaming media information and the access address to the stream-pushing client further includes:
   feeding back the response streaming media information and the access address to the stream-pushing client by a first HTTP response message to establish a first WebRTC communication connection between the streaming media server and the stream-pushing client; and receiving the processed target streaming media resource uploaded by the stream-pushing client further includes:

receiving the processed target streaming media resource uploaded by the stream-pushing client by the first WebRTC communication connection.

7. A method for downloading streaming media resources by a streaming server, comprising:

receiving an acquisition request for a target streaming media resource from a stream-pulling client, wherein the acquisition request is an HTTP GET request;

determining whether the target streaming media resource exists locally, and if the target streaming media resource exists locally, generating an access address for accessing the target streaming media resource, wherein the access address is a second ICE candidate, and the target streaming media information is a second Answer SDP; and feeding back the access address and target streaming media information associated with the target streaming media resource to the stream-pulling client by a second HTTP response message to establish a second WebRTC communication connection between the streaming media server and the stream-pulling client, to allow the stream-pulling client to obtain the target streaming media resource based on the access address and the target streaming media information by the second WebRTC communication connection.

8. The method according to claim 7, wherein the acquisition request includes a unique identifier for signifying the target streaming media resource, and determining whether the target streaming media resource exists locally further includes:

querying locally whether there is a streaming media resource having the unique identifier, if there is a streaming media resource having the unique identifier, determining that the target streaming media resource exists locally, and if there is no streaming media resource having the unique identifier, determining that the target streaming media resource does not exist locally.

9. The method according to claim 8, further comprising:

if the target streaming media resource does not exist locally, feeding back an error notification message to the stream-pulling client.

10. The method according to claim 7, wherein generating the access address for accessing the target streaming media resource further includes:

obtaining a public network IP address and a port address of the streaming server, and using a combination of the public network IP address and the port address as the access address for accessing the target streaming media resource.

11. The method according to claim 7, wherein feeding back the access address and the target streaming media information associated with the target streaming media resource to the stream-pulling client further includes:

returning a response message to the stream-pulling client, wherein a response message body of the response message includes the access address and the target streaming media information associated with the target streaming media resource.

12. A distribution system for streaming media resources, comprising a stream-pushing client and a streaming media server, wherein:

the stream-pushing client is configured to determine candidate streaming media information supported by the stream-pushing client, send an uploading request for a target streaming media resource to the streaming media server, wherein the uploading request includes the candidate streaming media information, receive a first response message returned by the streaming media server, wherein the first response message includes response streaming media information and an access address generated by the streaming media server, process the target streaming media resource according to the response streaming media information, and according to the access address, upload the processed target streaming media resource; and the streaming media server is configured to generate the response streaming media information based on the candidate streaming media information, generate the access address for accessing the target streaming media resource, feed back the first response message including the response streaming media information and the access address to the stream-pushing client, receive the processed target streaming media resource uploaded by the stream-pushing client, and associate and store the processed target streaming media resource with the response streaming media information.

13. The system according to claim 12, further comprising a stream-pulling client, wherein the stream-pulling client is configured to send an acquisition request for the target streaming media resource to the streaming media server, receive a second response message returned by the streaming media server, wherein the second response message includes the target streaming media information associated with the target streaming media resource and further includes the access address generated by the streaming media server, and obtain the target streaming media resource from the streaming media server based on the access address and the target streaming media information; and the streaming media server is further configured to, in response to the acquisition request, generate the access address for accessing the target streaming media resource, and feed back the access address and the target streaming media information associated with the target streaming media resource to the stream-pulling client.

14. The system according to claim 12, wherein the streaming media server, when generating the access address for accessing the target streaming media resource, obtains a public network IP address and a port address of the streaming server, and uses a combination of the public network IP address and the port address as the access address for accessing the target streaming media resource.

15. The system according to claim 12, wherein the uploading request is an HTTP POST request, the candidate streaming media information is a first Offer SDP, the response streaming media information is a first Answer SDP, and the access address is a first ICE candidate, the first response message is a first HTTP response message.

16. The system according to claim 15, wherein the stream-pushing client establishes a first WebRTC communication connection with the streaming media server, and uploads the processed target streaming media resource by the first WebRTC communication connection.

* * * * *